Dec. 21, 1926.
T. A. HILL
1,611,272
LIQUID GAUGE
Filed March 13, 1925
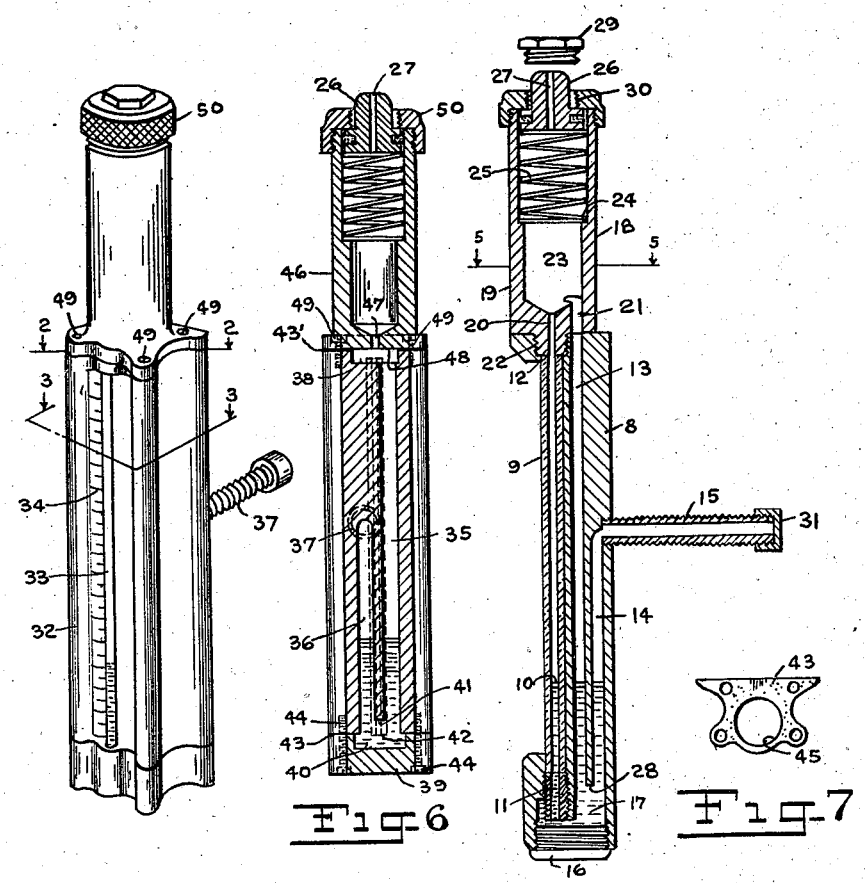
Inventor
Thompson A. Hill.

Patented Dec. 21, 1926.

1,611,272

UNITED STATES PATENT OFFICE.

THOMAS A. HILL, OF BROOKLYN, NEW YORK.

LIQUID GAUGE.

Application filed March 13, 1925. Serial No. 15,215.

My invention relates to improvements in liquid gauges, and more particularly has reference to, and is illustrated in the accompanying drawings, in its application to a gauge especially adapted for use upon the dashboard of an automobile for indicating the amount of gasolene in the tank thereof, although of course it will be readily understood that the gauge is adapted for use for other purposes.

Referring to said drawings, Fig. 1 illustrates in perspective, a suitable form of gauge completely assembled and closed ready for shipment. Fig. 2 is a cross-section on the line 2—2 of the same. Fig. 3 is a cross-section on the line 3—3 of the same. Fig. 4 is a longitudinal section looking sidewise at a modified form of the gauge. Fig. 5 is a cross-section on the line 5—5 of Fig. 4. Fig. 6 is a longitudinal section on the line 6—6 of Fig. 3. Fig. 7 is a plan view of one of the gaskets used in the form shown in Figs. 1, 2, 3, and 6.

In the form shown in Figs. 4 and 5, 8 indicates the body portion which may be cast from metal such as an alloy, and is provided in the front with a glass tube 9, with suitable scale marks adjacent the side thereof, for indicating the height of the indicating fluid 10 therein. This gauge glass is pushed in through the bore 11, into the opening 12 in the top of the body portion as shown. Behind the gauge glass in the body portion of the gauge are two circular bores or passages 13 and 14, the latter being connected by a tube 15, with the air line which extends close to the bottom of the tank of liquid to be gauged. 16 indicates a plug in the bottom of the gauge leaving a storage chamber 17 above the same for the gauge liquid which also enters the passages 13 and 14 as shown.

18 indicates a finger pump comprising an outer shell 19, provided with an outlet passage 20 for air or other gas to be injected into the pressure circuit, and 21 indicates another passage communicating with the bore 13, which takes a larger quantity of air than the passage 20, the passage 21 being preferably elongated as indicated in Fig. 5. The pump is provided with a threaded base 22 for securing the same to the body portion 8 of the gauge, and the lower part of the central bore 23 of the pump, is preferably restricted to provide a ledge 24 for the spring 25. 26 indicates a button plunger having an internal central bore 27, which when depressed with the finger against the action of the spring 25, compresses the air within the chamber 23, and into the bores 9, 13, and 14, the greater quantity passing through the bore 13, and passing down through the indicator liquid 10 therein, and beneath the lower edge 28 of the separating wall, into the bore 14, passing up through the indicator liquid into the pressure circuit 15.

By this method of injecting or replenishing air in the pressure circuit, the reading column 9 is not violently disturbed, whereas if the air were pumped through the reading column 9 into the pressure circuit, the liquid would be entirely forced out of the reading column, and when returning would be frothy, and require a short period of time before coming to rest, so that a proper reading could be taken, whereas in the present instance only a small amount of the air passes into the top of the reading tube 9 through the passage 20, the major portion of the air passing down through the tube 13, and beneath the lower end of the separating portion of the gauge 28, into the pressure circuit, thus there is a balancing of pressure at both ends of the reading column, maintaining the same substantially stable, while the air is being replenished in the pressure circuit. The threaded cap 29 is adapted to engage the internal threads 30, in the top of the pump, as the button 26 is depressed, so that the instrument may be properly sealed for shipment with the indicating liquid therein, and for that purpose a suitable cap such as 31, or other suitable means may be used at the end of the connecting tube 15.

In the modification shown in Figs. 1 to 3, and 6 inclusive, the body portion of the gauge is preferably formed substantially as indicated at 32, the indicating tube being indicated by the reference character 33, and the reading scale by reference character 34. The body portion 32 may be cast or drilled with bores or passages 35 and 36, the latter being preferably shorter and connecting with the pressure tube 37. In the top of the body portion, a circular recess 38 may be formed, and at the bottom of the body portion, a storage base 39 may be provided, having a storage well 40, connected with the recess 38 by the bore or passage 35, said storage well 40 also communicating with the bottom of the passage 36, the upper end of said passage opening into the pressure connection 37. The web or partition of metal between the passages 35 and 36 is shorter, as indicated at 41, than the bottom of the gauge glass indicated at 42, and the base portion may be provided with a gasket 43 of suitable material, through which screws such as 44 may be passed, thereby securely sealing the bottom of the gauge as shown. A similar gasket is indicated at 43′ at the top of the body portion of the gauge, the central hole 45 of said gaskets being co-extensive with the storage well 40 and space 38 respectively. The finger pump 46, may be similar in construction to the one illustrated in connection with Fig. 4, except that it will be noticed that there is only one outlet 47 therefrom, said outlet communicating with the recess or chamber 38, which opens into the passages 35, and 42. The air outlet 47 of the pump it will be noticed comes immediately over the centre of the recess 38, and between the passages referred to, so that in the event of the indicator fluid being jolted or forced upwardly, it strikes the bottom 48 of the pump, and is deflected downwardly again instead of passing upwardly into the pump, with the possibility of escaping through the push button opening 27.

In this form also the column of indicating liquid in the indicator tube is fairly stabilized while the replacement of air is being provided for, and in order to get at the gauge for replacing liquid, cleaning, or repairs, the pump may be conveniently removed by withdrawing the screws 49, and by removing the base as stated. The cap 50, enclosing the button 26, may also be removed by unscrewing the same as shown.

It will be understood that the lower the separating web 28 projects, the less indicating fluid will be required for providing a proper seal, but it should be high enough to allow the air to escape beneath the same from the passage 13 to the passage 14, or from the passage 35 to the passage 36, otherwise air will pass entirely through the reading column or glass tube, and cause an undue disturbance of the fluid therein, thereby frothing the same and delaying an accurate reading. In a properly designed gauge according to the preferred form of my invention no air will pass out of the bottom of the reading glass or tube but will pass down and through the fluid in the middle leg 13 or 35 of the gauge and from there out into the pressure line 15 or 37. For the foregoing reason, the depth of the fluid beneath the gauge glass may be very slight, forming a restricted passage through which no air will pass, yet which will have a further steadying effect upon the column of fluid in the reading column.

Of course it will be understood that various modifications may be made in the construction and arrangement of parts without departing from the spirit of the invention as claimed.

I claim—

1. In an article of the class described, a body portion provided with a well in the base thereof containing indicating liquid, an air restoring device operatively connected at the upper part of said body portion, said body portion also having passages communicating between said well and said restoring device, another passage in said body portion also communicating with said well and adapted to be connected to a tank containing liquid to be gauged, said indicating liquid normally level in the lower portions of said passages, said restoring device being adapted to force air downwardly through said first mentioned passages and through said indicating liquid beyond said other passage.

2. In an article of the class described, a body portion provided with a well in the base thereof containing indicating liquid, an air restoring device operatively connected at the upper part of said body portion, said body portion also having passages communicating between said well and said restoring device, another passage in said body portion also communicating with said well and adapted to be connected to a tank containing liquid to be gauged, said indicating liquid normally level in the lower portions of said passages, said restoring device being adapted to force air downwardly through said first mentioned passages and through said indicating liquid beyond said other passage, said air restoring device removably secured to said article.

3. In an article of the class described, a body portion provided with a well in the base thereof containing indicating liquid, an air restoring device operatively connected at the upper part of said body portion, said body portion also having passages communicating between said well and said restoring device, another passage in said body portion also communicating with said well and adapted to be connected to a tank containing liquid to be gauged, said indicating liquid normally level in the lower portions of said passages, said restoring device being adapted to force air downwardly through said first mentioned passages and through said indicating liquid beyond said other passage, said article having front corner portions extending outwardly beyond the center of the front portion of said article.

4. In an article of the class described, a body portion provided with a well in the base thereof containing indicating liquid, an air restoring device operatively connected at the upper part of said body portion, said body portion also having passages communicating between said well and said restoring device, another passage in said body portion also communicating with said well and adapted to be connected to a tank containing liquid to be gauged, said indicating liquid normally level in the lower portions of said passages, said restoring device being adapted to force air downwardly through said first mentioned passages and through said indicating liquid beyond said other passage, said restoring device having a removable top.

5. In an article of the class described, a body portion provided with a well in the base thereof containing indicating liquid, an air restoring device operatively connected at the upper part of said body portion, said body portion also having passages communicating between said well and said restoring device, another passage in said body portion also communicating with said well and adapted to be connected to a tank containing liquid to be gauged, said indicating liquid normally level in the lower portions of said passages, said restoring device being adapted to force air downwardly through said first mentioned passages and through said indicating liquid beyond said other passage, and a removable plug in the bottom of said article.

In testimony whereof I hereunto affix my signature.

THOMAS A. HILL.